May 2, 1933.   R. B. FAGEOL   1,907,179
BEVEL GEAR THROUGH DRIVE
Filed Feb. 5, 1930
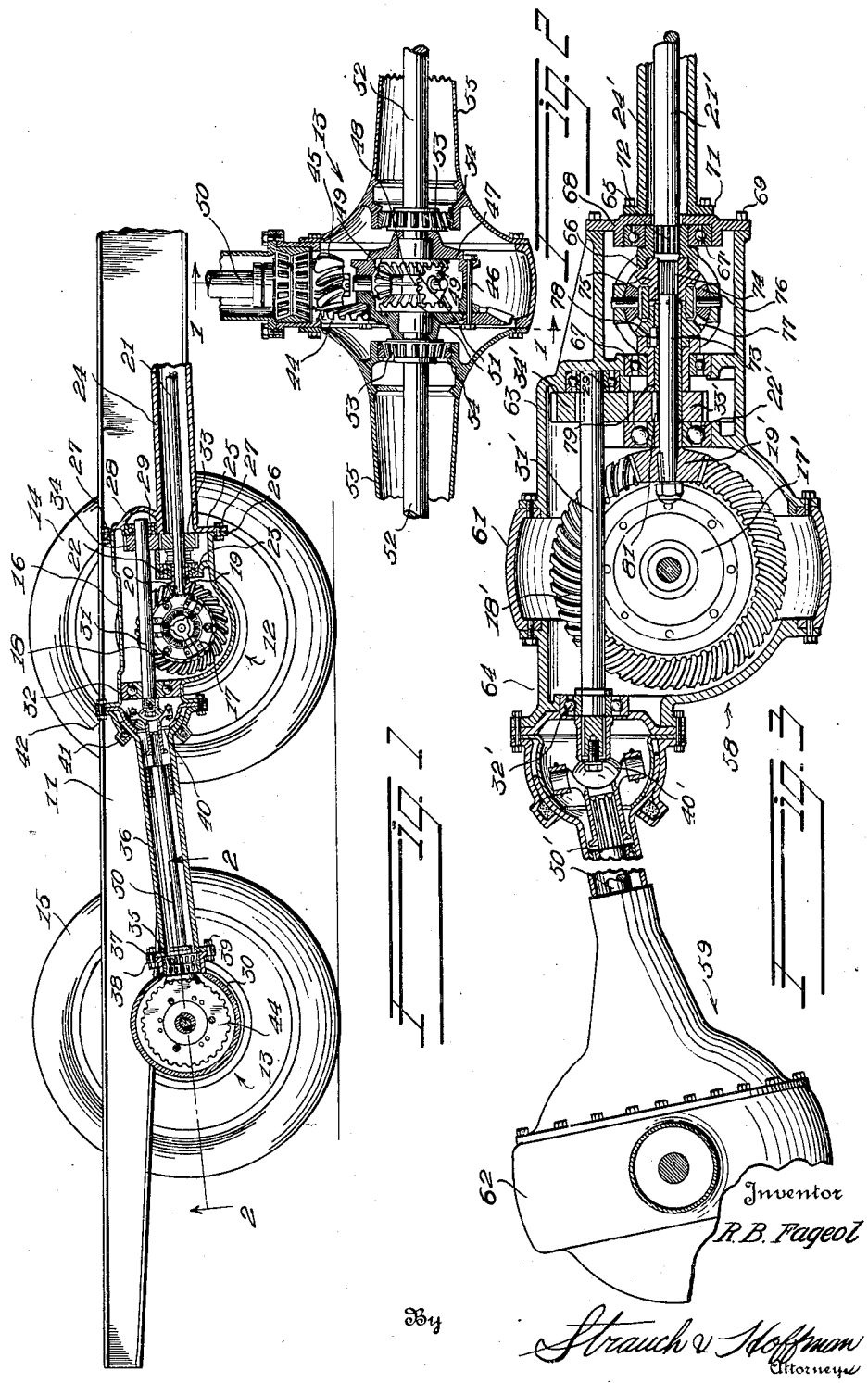
Inventor
R. B. Fageol
By Strauch & Hoffman
Attorneys Patented May 2, 1933

1,907,179

UNITED STATES PATENT OFFICE

ROLLIE B. FAGEOL, OF LOS ANGELES, CALIFORNIA, ASSIGNOR, BY MESNE ASSIGNMENTS, TO AUTOMOTIVE ENGINEERING CORPORATION, A CORPORATION OF DELAWARE

BEVEL GEAR THROUGH DRIVE

Application filed February 5, 1930. Serial No. 426,103.

The present invention relates to through drives for tandem bevel gear drive axles.

More particularly, the invention relates to a novel through drive construction for tandem bevel gear drive axles whereby dual drive multi-wheel vehicle constructions can readily be provided by the utilization of standard bevel gear drive axles and the association therewith of relatively few and simple parts for providing a through drive which is compact, effective, and durable in operation and which can be constructed at relatively low cost.

As is well understood, in bevel gear drive axles, the ring gear of the differential of such axle usually is driven by a propeller shaft pinion which operatively engages the ring gear with the propeller shaft radial to the gear and normal to the axis thereof.

Straight line through drives have been provided with worm driven axles in which no difficulty is encountered as the propeller shaft worm operatively engages the worm ring gear tangential thereto whereby a second shaft or a continuation of the standard propeller shaft can be provided for driving a second axle.

Straight line through drives have also been provided for tandem axles in which the drive shaft pinions operatively engaged the axle, differential ring gears at one side thereof either above or below the horizontal planes of the axles, but in such arrangements the ring gears were of the hypoid type and not of the spiral bevelled tooth type adapted to be driven by a pinion whose drive shaft, when extended, would intersect the axis of the ring gear as in standard bevel gear drive constructions.

Split through drives, for tandem bevel gear drive axles, have been provided but these involved either a comparatively complicated drive arrangement or specially designed axles of expensive construction for a particular drive arrangement.

It is accordingly, a primary object of the present invention to provide a through drive for standard bevel gear drive axles by the utilization of relatively few simple and inexpensive parts whereby dual drive multi-wheel vehicles can readily be built up by employing standard bevel gear drive axles and associated parts, whereby the cost of such construction is greatly reduced and all of the advantages of the conventional bevel gear drive are retained.

Further objects of the present invention, in providing a split through drive for bevel gear drive axles whereby a pair of such axles are simultaneously driven, are, to wit: to substitute a comparatively simple differential housing and shaft support for the differential housing of one of the conventional axles; to invert the other standard axle end for end in order that both axles may be driven in the same direction; to drive the first axle by means of a standard propeller shaft while driving the second axle by means of a shortened standard propeller shaft, with said propeller shaft operatively connected by means of a third shaft rotatably journalled in said substituted differential housing above the first propeller shaft; and to provide said latter shaft with a gear connection to the first propeller shaft and a universal connection to the second propeller shaft.

It is a still further object of the invention to provide a through drive for standard bevel gear drive axles arranged in tandem which drive comprises a separate drive shaft operatively associated with each axle and a third shaft rotatably journalled in a differential housing of one of the axles, the drive shaft for the last mentioned axle being operatively connected with the said third shaft by co-operating gears for imparting rotation of said drive shaft to said third shaft at the same speed of rotation but in the opposite direction, and the said third shaft having a universal connection with the other drive shaft for driving the other axle, the last mentioned axle being inverted to secure rotation thereof in the same direction as the first axle.

Another object of the invention is to provide a through drive for bevel gear drive axles arranged in tandem, comprising a drive shaft operatively associated with each of the axles, a third shaft extending above the differential spider of the said last axle substantially in the vertical plane of the drive shafts and operative connections, without the interposition of differential gearing, between the said drive shafts and said third shaft.

It is also an object of this invention to provide a through drive for bevel gear drive axles arranged in tandem, which comprises a pair of drive shafts operatively associated with the respective axles, a differential operatively associated with a motor driven propeller shaft, a sleeve rotatably journalled on the first drive shaft, a shaft journalled in the housing of the axle driven by the said first shaft and operatively connected with the second drive shaft; the said first drive shaft and said sleeve being differentially driven by said differential, and operative driving connections between said sleeve and said rotatably journalled shaft.

With the above objects in view as well as others that will become apparent during the course of the following disclosure, reference will be had to the accompanying drawing forming part of same and wherein:

Figure 1 is a longitudinal vertical sectional view of one of the embodiments of my invention, the view being taken substantially through the transverse centers of the drive axles as represented by the line 1—1 in Figure 2.

Figure 2 is a horizontal sectional view through the rear axle in Figure 1 substantially on a plane represented by line 2—2 and viewed in the direction of the arrows.

Figure 3 is a view similar to Figure 1 disclosing a modified form of my invention, with the frame and wheels removed and parts of the apparatus broken away.

Referring to the drawing by reference characters, in which like characters designate like parts, and referring first to Figures 1 and 2, numeral 11 designates a frame which may be a single integral structure or may comprise a standard frame for four-wheel vehicles with an extension frame secured thereto. Disposed beneath the frame 11 and yieldably connected therewith by spring suspensions (not shown) is a pair of longitudinally spaced drive axle units, designated generally by numerals 12 and 13, having associated therewith drive wheels 14 and 15 respectively.

The axle units 12 and 13 preferably are of the bevel gear type, such as the standard Ford bevel gear drive axles, modified in the manner hereafter set forth for adapting them to the through drive construction associated therewith.

The axle unit 12 embodies a special center casting or differential housing 16 for enclosing the standard differential construction 17 and further providing a bearing support for a through drive construction about to be described.

The ring gear 18 of the differential 17 is driven by a pinion 19 keyed, as at 20, on the end of a propeller shaft 21 which shaft is driven through a universal joint by the transmission (not shown) of the vehicle in well known manner.

The hub portion of the pinion 19 is rotatably journalled in a bearing 22 which bearing is supported in a suitable seat 23 formed with casting 16.

The shaft 21 is enclosed by a torque tube 24 which at its forward end has a universal ball connection (not shown) concentric with that of shaft 21 in well known manner. The rear end of the tube 24 is flanged as indicated at 25 for detachable connection with a mating flange 26 of casting 16 by bolts 27 for rigidly connecting the tube 24 with the casting 16. The flange 25 is provided with an integral cap portion 28 for providing a seat for a bearing 29.

Rotatably journalled in the bearing 29 is the forward end of a relatively short shaft 31 the rear end of which is journalled in a bearing 32 disposed in casting 16 in such manner that the shaft 31 is substantially parallel with the shaft 21.

Rotation of the shaft 21 is imparted to the shaft 31 by like spur gears 33 and 34 keyed to shafts 21 and 31 respectively and disposed in relative meshing engagement within the housing 16.

The spur gears 33 and 34 are of uniform construction and are of such diameter and so disposed that the shaft 31 will be arranged above the shaft 21 in the vertical plane thereof to permit the shaft 31 to clear the spider case of the differential 17.

While the cap portion 28 is disclosed as integral with the tube 24 such portion may be provided in a separate end plate whereby a standard torque tube may be utilized with the end flange thereof bolted to said end plate.

The rear end of the shaft 31 is connected by a standard universal joint 40 with the front end of a drive shaft 50.

The drive shaft 50 is preferably a shortened standard shaft and is rotatably journalled adjacent its rear end in standard bearings 35 in the differential housing 30 of the axle unit 13. The shaft 50 is surrounded by a torque tube 36 the rear flanged end 37 of which is secured to a similar flange 38 of the housing 30 by bolts 39 and the forward end of the tube 36 is detachably connected to the casting 16 through a conventional ball joint structure 41, portions of which are secured to casting 16 by bolts 42.

The axle 13 which is shown in detail in Figure 2 is a standard Forl type bevel gear drive axle comprising a ring gear 44 in operative engagement with a pinion 45 secured to the end of the shaft 50. The ring gear 44 is attached, by bolts 46, to a differential case 47 in which case is disposed a differential spider 48 provided with pinions 49 for co-operation with the bevel gears 51 keyed to the inner ends of axle sections 52, which axle sections are rotatably journalled in bearings 53 disposed within seats 54 in the axle housing sections 55.

It will be noted that by the utilization of the co-operating gears 33 and 34 for imparting rotation of shaft 21 to shaft 31 the shaft 31 will be rotated at the same rate of speed as that of the shaft 21 but in the opposite direction.

In order to compensate for this reversal of drive shaft rotation and yet be able to utilize a standard rear bevel gear drive axle, the rear standard axle 13 is mounted upside down i. e., inverted end for end with respect to its usual position whereby the ring gear 44 is disposed on the opposite side of the pinion 45 from that of its normal position. This will readily be seen by inspecting Figure 1, in which the toothed side of the ring gear appears in axle unit 12 (usual position) and in which the plane or back face of the ring gear appears in unit 13 (inverted position).

In accordance with my present invention as above described a dual drive multi-wheel vehicle can readily be provided either as a new construction or as an attachment for standard four-wheel vehicles by the utilization of standard bevel gear drive axles together with a few additional parts for providing a through drive for said axles.

The forward axle 12 represents a modification of the standard Ford bevel gear drive axle only in that a special center casting or housing 16 is necessary. The rear axle 13 requires no modification of the standard axle construction, it being only necessary to assemble the rear standard axle construction in reversed position as disclosed for compensating for the reverse in direction of rotation of shaft 31 caused by the co-operating gears 33 and 34.

In Figure 3 is disclosed a modified embodiment of my invention disclosing the application of the through drive as above disclosed to banjo-type axle housings.

In accordance with this embodiment of the invention, a differential is provided for differentially driving the tandem axles with respect to each other, but it will be understood that the added differential has equal application to the form of Figure 1.

Referring to Figure 3 a pair of bevel gear drive axle units 58 and 59 include axle housings 61 and 62 of the banjo-type such as are employed in Chevrolet and other similar motor vehicle constructions. The otherwise standard housing 61 is modified by the provision of front and rear drive shaft bearing supporting members 63 and 64 for converting the standard housing into proper form for a through drive arrangement.

The shaft 21' is splined as indicated at 65 to a differential cage 66 which cage is rotatably journalled in bearings 67 and 67' disposed respectively in housing member 63 and an end plate 68. The latter is secured to member 63 by bolts 69.

The shaft 21' is enclosed within a torque tube 24' similar to tube 24 but being provided with an end flange 71 removably secured to the end plate 68 by bolts 72. Splined upon a separate reduced shaft section 73, as indicated at 74, is a bevel gear 75 which is in meshing engagement with pinions 76 carried by a spider within the differential cage 66 which pinions are in turn in meshing engagement with a bevel gear 77 that is keyed as at 78 to a sleeve 79 rotatably mounted on shaft 73.

The shaft section 73 has, keyed to the rear end thereof, a pinion 19' the hub portion of which is journalled in a bearing 22' in member 63 and which pinion is in meshing engagement with the ring gear 18' for driving the differential cage of axle unit 58. The spur gear 33' is keyed to the sleeve 79 as indicated at 81 and which spur gear is in meshing engagement with a spur gear 34' as in the first form of the invention.

The gear 34' is keyed to a shaft 31' which is operatively associated with a drive shaft 50' as in the previous embodiment of the invention. The bearing 29' for the forward end of shaft 31' is arranged in a seat in cap member 63. In fact the entire differential arrangement for axles 58 and 59 together with the bearings for the various shaft sections are carried within the end cap member 63.

The rear axle unit 59 of Figure 3 is substantially the same as that disclosed in Figure 1, except that it utilizes a banjo-type housing, and for this reason it is not shown in detailed section.

It will be seen from the foregoing detailed description that in accordance with my present invention a through drive is provided for standard bevel gear drive axles by the utilization of which, dual drive multi-wheel vehicles can readily be constructed or built up at relatively low cost due to the fact that relatively few special parts, all simple and inexpensive, are required for association with the standard axle constructions now in production and readily obtainable on the market.

While I have disclosed but a single specific embodiment of my invention, such is to be considered as illustrative only and not restrictive since the scope of the invention is defined by the subjoined claims rather than by the foregoing specific disclosure.

What I claim and desire to secure by United States Letters Patent is:—

1. A through drive for tandem arranged bevel gear drive axles comprising a primary drive shaft directly driving one of said axles; a second drive shaft for driving the other of said axles; a sleeve rotatably journalled on said primary drive shaft; a differential operatively associated with said primary drive shaft and said sleeve; a propeller shaft for driving said differential; a shaft rotatably journalled in the housing of said first axle; a flexible driving connection between said last shaft and said second drive shaft; and operative driving connections between said last shaft and said sleeve.

2. The construction defined in claim 1 in which said operative driving connections comprise co-operating gears carried by said rotatably journalled shaft and said sleeve for providing rotation of said rotatably journalled shaft commensurate with said sleeve and in opposite direction thereto; and in which said second drive shaft is substantially aligned with the axle centers and operatively engages the differential ring gear of said second axle on the opposite side thereof relative to said primary drive shaft for compensating for the reverse rotation of said rotatably journalled shaft.

3. A tandem axle through drive assembly comprising dual axle housings each having a centrally disposed differential mechanism and a pair of axle shafts driven thereby; a primary drive shaft section extending rearwardly into the foremost axle housing at a point midway between the ends of the latter and with its axis in intersecting relationship with that of said foremost housing; an intermediate drive shaft section journaled in said foremost housing in offset parallelism with and in the same vertical plane as said primary shaft section; gearing for driving the intermediate section and a third driving shaft section coupled to said intermediate section, said third section projecting into the rear axle housing at a point midway between the ends of the latter and said third section further being disposed in the same vertical plane as said primary and intermediate shaft sections; said foremost housing having a central overhanging portion; and there being a third differential mechanism mounted in said overhanging portion with its axis aligned with that of said primary section, said third mechanism embodying differentially driven units connected to said primary section and said gearing to drive the former differentially with respect to the latter; and means aligned with said primary section and in actuating engagement with said third differential mechanism.

In testimony whereof I affix my signature.

ROLLIE B. FAGEOL.